Figure 1:
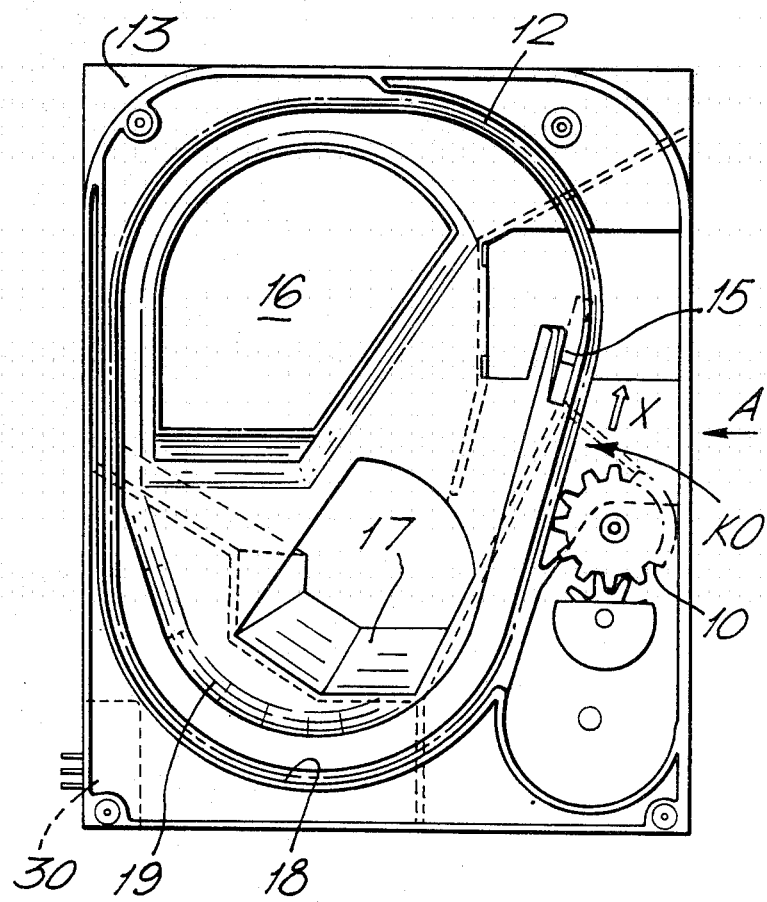

United States Patent [19]

Bellis et al.

[11] Patent Number: 4,535,794
[45] Date of Patent: Aug. 20, 1985

[54] MACHINE HAVING A COIN OR TOKEN PAYOUT MECHANISM

[75] Inventors: Robert D. Bellis, Nr. Oldham; Timothy W. Tod, Abergavenny; Roger J. Tod, Crickhowell, all of Great Britain

[73] Assignee: Coin Controls Limited, Lancashire, England

[21] Appl. No.: 442,801

[22] Filed: Nov. 18, 1982

[30] Foreign Application Priority Data

Nov. 20, 1981 [GB] United Kingdom ............... 8135027

[51] Int. Cl.³ .............................................. G07D 9/04
[52] U.S. Cl. ..................................... 133/8 E; 221/253
[58] Field of Search ............... 221/253, 254; 133/3 F, 133/8 E, 4 A, 4 R; 198/607

[56] References Cited

U.S. PATENT DOCUMENTS 1,035,761 10/1912 Larsen ................................ 133/8 E
3,061,145 10/1962 Sharpe ............................ 221/253 X

FOREIGN PATENT DOCUMENTS 786596 6/1935 France ............................... 221/253

Primary Examiner—Stanley H. Tollberg
Attorney, Agent, or Firm—Wolf, Greenfield & Sacks

[57] ABSTRACT

A dispensing mechanism, preferably for handling coins or tokens for amusement or gaming machines comprising a selectably drivable endless loop conveyor whose path of travel includes a bight. A store for the article to be dispensed feeds said articles either onto the interior of the conveyor or the exterior thereof. The conveyor is preferably formed from a plurality of hingedly connected segments, each of which has a pick-up lip thereon provided with an upstanding stirrer. The conveyor forms part of the bottom of the store so that any supply of articles to be dispensed which are held therein are stirred as the conveyor travels through the bight, the conveyor entraining an article and dispensing it to an exit located above the bight.

22 Claims, 7 Drawing Figures

MACHINE HAVING A COIN OR TOKEN PAYOUT MECHANISM

This invention relates to a dispensing mechanism and more particularly but not exclusively to a coin or token handling mechanism for use in vending machines, amusement or gaming machines, change giving machines or any other machine that requires a payout of coins or tokens to be made for instance in the form of a prize or as change.

The dispensing mechanism of the present invention is particularly suitable for use with amusement or gaming machines so the following description of the problems which led to the development of the mechanism will be described in relation to such machines. However, this description is given for illustrative purposes only so it is not intended that the mechanism of the invention be restricted to use with only such machines. Furthermore, the mechanism will be described in terms of coin handling but it will be appreciated that it will work equally well with tokens without any need for modification. In an amusement machine such as an AWP (amusement with prize), the money paid out as a prize is normally fed from a series of solenoid operated payout tubes located in the machine, each tube containing a column of coins and the payout being made from the bottom thereof. If the machine is to have an adequate payout capacity, very tall payout tubes (up to 2 feet long) have to be used which means that, because of space limitations in the cabinet housing the machine, the payout cup or tray must be located towards the bottom of the machine. Accordingly, the user of the machine has to constantly stoop to collect any winnings and furthermore, it can be difficult to find all of the winnings due to its low location and the often poor surrounding lighting conditions. Payout tubes are also very laborious to fill because the coins sometimes have to be manually inserted in them one at a time.

Coin hoppers are known which are easy to fill by simply pouring a bag of coins into the hopper. Thus the hopper can be replenished with large quantities of coins very quickly. These hoppers have means for dispensing coins therefrom individually but they are bulky in size and there is no room in the amusement machine in or adjacent the area where the coins are inserted to house such a hopper. As the only such area in an amusement machine is in the base thereof, there is no way that it can be adapted for such use because its location would tend to make the payout opening in the cabinet either in much the same location as with payout tubes or worse still, even lower. What is needed therefore is a mechanism which can be easily and quickly filled and housed in the lower area of the cabinet but which can transfer coins removed therefrom to a payout point located above it. This would mean that the coin store from which the payout is to be made could be located in the lower part of the machine whereas the payout point could be much higher, even alongside the insertion point for the coins to activate the machine being used.

It is an object of the invention therefore to provide a dispensing mechanism having a store which is quick and easy to fill and which allows the articles therein to be dispensed at an exit point located above the base of said store.

According to the invention, there is provided a dispensing mechanism comprising a selectably drivable endless loop conveyor whose path includes a bight portion, a store for continuously feeding a supply of the articles to be dispensed into said bight, the conveyor having a plurality of pick-up means thereon, each of which is adapted to entrain, in use, an article to be dispensed as the conveyor passes through the supply thereof in the bight and transport it upwardly to an exit point above the bight where it is fed from the conveyor.

The articles may be fed from the store, which is preferably a hopper, to the bight in the conveyor so that they are deposited on the outside surface thereof. However, preferably, they are fed on to the inside surface of the conveyor as this enables a much more compact mechanism to be designed.

The conveyor may take any convenient form such as a belt but a plurality of hingedly connected segments is preferred.

The pick-up means preferably comprises a plurality of upstanding lips, each extending across the width of the conveyor and being obliquely inclined to the direction of movement thereof. The lips are preferably parallel to each other and are spaced from each other in the direction of movement of the conveyor by a distance, in the case of a coin dispenser, which is greater than the diameter of the largest coin to be handled so that no coin can become trapped and gripped between two adjacent lips at any point on the path of the conveyor.

In a preferred embodiment, the conveyor is formed from a plurality of hingedly connected conveyor segments, each segment having one of said pick-up lips thereon, each lip having a stirrer formed at one end thereof adjacent the edge of the segment. This stirrer is preferably an upstanding projection which results in the articles in the store lying in the inside bight of the conveyor loop being stirred as the conveyor travels therethrough, thereby preventing, in the case of coins, rolls thereof forming which could affect and reduce their efficient pick-up by the lips.

Conveniently, the junction between the upper surface of each conveyor segment and its lip is chamfered. For coin dispensing, a shallow recess is preferably formed in the upper surface of the conveyor segment alongside said chamfer to discourage coins covered with sticky substances such as dried beer from adhering to the segment and therefore not being able to roll off the conveyor at the exit point.

In the preferred embodiment, the bight comprises a part of the conveyor loop which is of a constant radius. Similarly, it is preferred but not essential that the other bends in the conveyor loop are of the same radius.

Preferably, the conveyor is formed of a plastics material, the conveyor segments having pins extending laterally therefrom which fit in and slide along a track formed in plates on either side thereof. With this arrangement, the system is self lubricating and self cleaning thereby ensuring minimum maintenance. Polyacetal has been found to be particularly suitable for the side plates and the tracks formed therein, the hinge pins being of nylon.

The mechanism of the invention can handle any article to be dispensed. In the case of coins, they can be of one denomination only or a mixture of denominations. For the latter, however, some form of gating or counting system must be provided at the exit point to check on the values of the coins paid out.

When the dispenser is to be used for coins, the width of the conveyor is less than the sum of the diameter of the two smallest coins to be handled as this helps to ensure that only one coin is picked up by each lip for transportation upwardly to the exit point. If two coins do manage to travel upwardly resting on the same lip, a projection is preferably provided on one side of the conveyor to knock the unwanted second coin off the lip back into the coin store in the bight or on to the next available empty lip below it.

Figure 2:
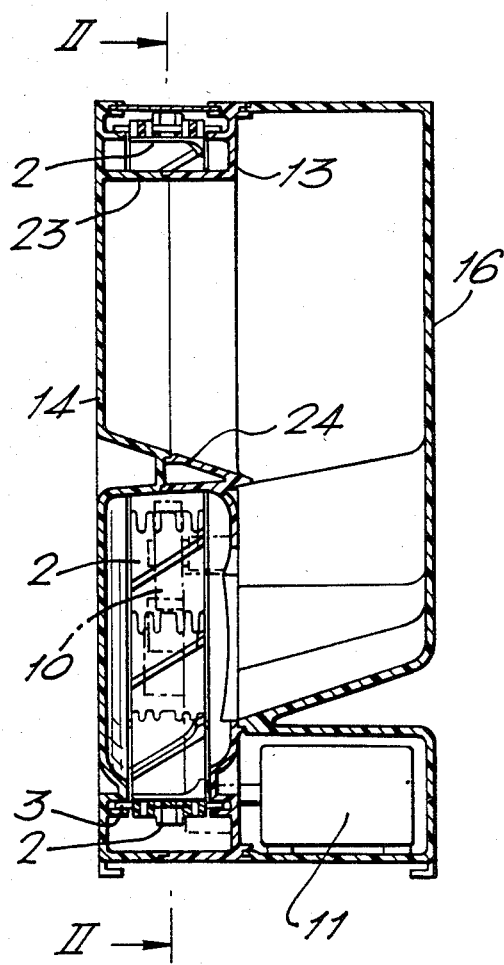
Figure 3:
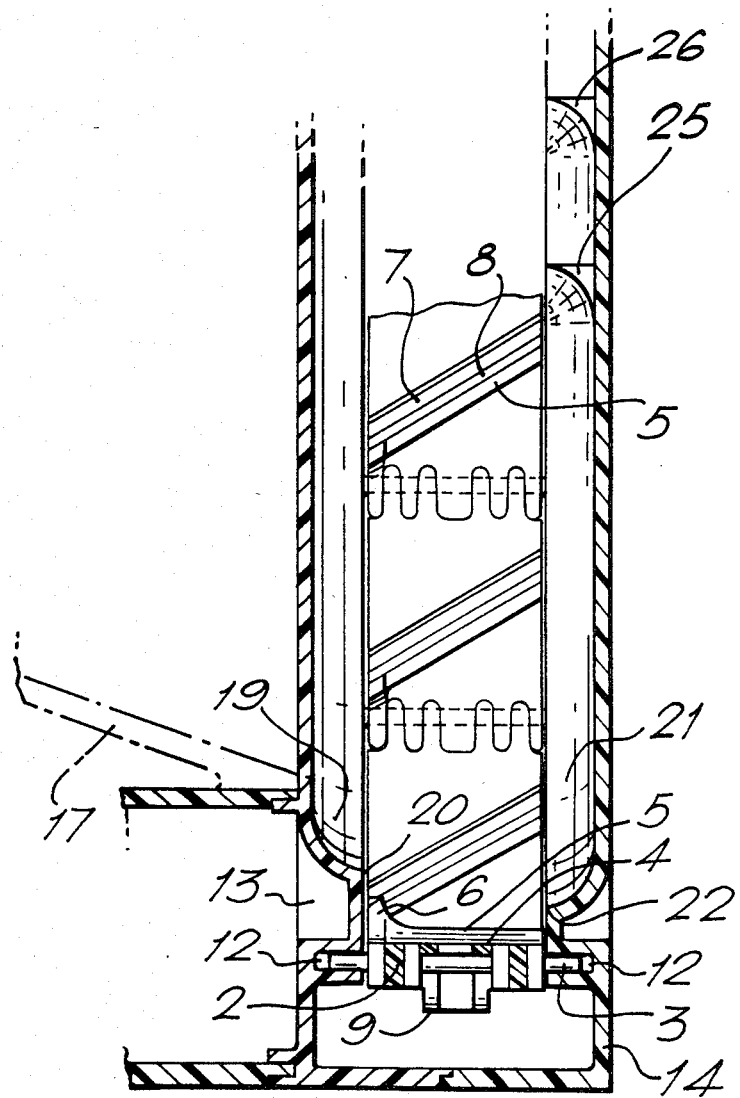
Figure 4:
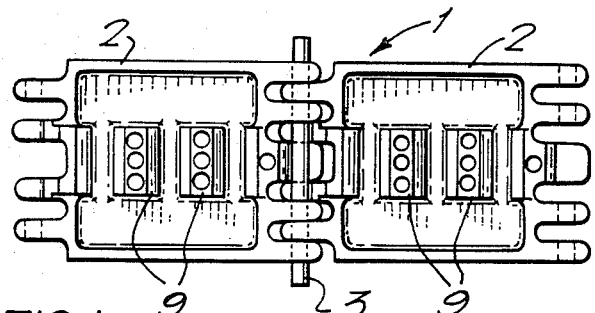
Figure 5:
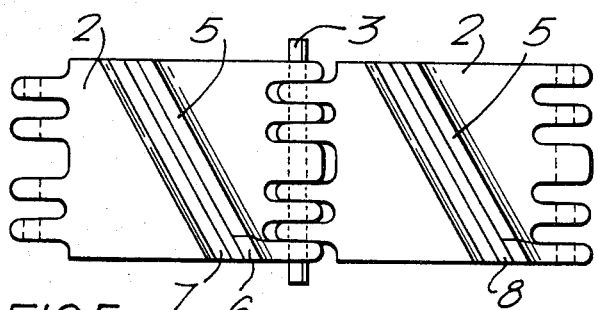
Figure 6:
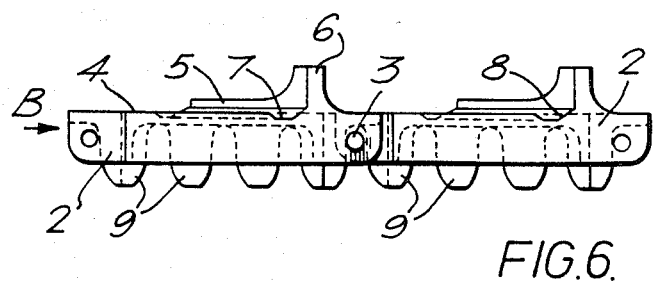
Figure 7:
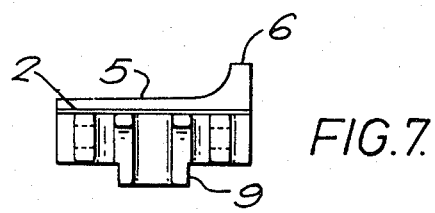

A preferred embodiment of a coin or token handling mechanism will now be described, by way of example only, with reference to the accompanying drawings, in which:

FIG. 1 is a side elevation of the mechanism of FIG. 2 taken along the line II—II thereof, FIG. 2 is a schematic end view of the mechanism of the invention when viewed in the direction of arrow A in FIG. 1, FIG. 3 is a simplified scrap view of the region of the mechanism where the coins or tokens are fed on to the conveyor, FIG. 4 is an underneath plan view of two conveyor segments, FIG. 5 is a top plan view of the conveyor segments of FIG. 4, FIG. 6 is a side elevation of the conveyor segments of FIGS. 4 and 5, and FIG. 7 is an end view in the direction of arrow B in FIG. 6.

Referring to the drawings and particularly FIGS. 4–7, there is shown a conveyor 1 made up from a plurality of segments 2 hingedly connected together by means of pivot pins 3. Each conveyor segment 2 is provided on its top surface 4 with a coin pick-up lip 5 which extends obliquely across the width of the segment from one corner thereof to a point approximately midway along the opposite side of the segment. An upstanding projection 6 which acts, in use, as a stirrer in a manner to be described is formed at one end of each lip and a recess 7 is formed in the upper surface of the conveyor segment adjacent the lip, a chamfered edge 8 being formed at the junction between the bottom of the recess 7 and the lip 5. As can be seen from the drawings, the lips 5 extend parallel to each other. The underside of each conveyor segment is formed with a plurality of downwardly projecting teeth 9 which mesh with drive wheel 10 (see FIG. 1) driven by motor 11 (see FIG. 2).

The conveyor segments 2 are connected together by means of the hinge pins 3 to form an endless loop. The pins 3 are fitted in and slide along a track 12 formed in a pair of spaced side plates 13, 14, the conveyor being driven round said track by the engagement of the gear wheel 10 with the teeth 9 on the outside of the loop conveyor. The conveyor is driven in the direction of the arrow X. An exit point 15 for the coins is provided on the upward side of the path of travel of the conveyor.

Coins or tokens are fed on to the conveyor from a hopper 16 clamped onto the outside face of side plate 13, the hopper having a downwardly inclined bottom 17. The mouth of the hopper bottom opens directly onto a bight 18 of constant radius at the bottom of the conveyor loop so it can be seen that coins in the hopper 16 will automatically fall under gravity down the inclined hopper bottom 17 and on to the inside surface of the conveyor. The advantage of this arrangement, i.e. feeding to the inside of a closed loop conveyor, is that all the area alongside the conveyor and more importantly, most of the area inside it, can be utilised to house coins. Thus a very large capacity coin store is provided in a very compact space. The usable capacity can best be seen from FIG. 2.

Referring now to FIG. 3, certain important features of the illustrated preferred mechanism can be seen which prevent "pinch points" occurring, that is points at which a coin or coins can become jammed due, for instance, to a sharp projection or a closing radius. Side plate 13 is formed with a radiussed recess 19 alongside edge 20 to encourage coins in the bight 18 to slide back onto the conveyor. It should be noted that the top of the stirrer 6 is always located below edge 20 so that a coin entrained onto the conveyor cannot slide off again. On the opposite edge however, side plate 14 has a radiussed recess 21 but edge 22 is generally coplanar with the upper surface of the conveyor so that any coins which find their way onto the radiussed recess 21 tend to slide back on to the conveyor again.

The operation of the illustrated embodiment just described will now be explained. The whole of the space alongside the conveyor 2 as well as the part of the space inside it between upper and lower walls 23, 24 (see FIG. 2) is filled with coins either from a bag or automatically, in use, from the coin accepting mechanism. Normally, the conveyor 2 is stationary but, should someone playing the machine to which the coin handling mechanism is fitted achieve a winning line requiring a payout to be made, an appropriate signal would be generated to start the motor 11 and drive the conveyor 2. This would result in the conveyor being driven through the coins piled in the bight 18 which would be stirred and some coins would drop into the spaces on the conveyor between adjacent lips 5. They would thus be entrained upwardly towards the exit point 15, desirably with one coin resting on each lip 5. Due to the distance between the lips being less than the sum of the diameters of two coins and because of the stirrer 6, even if 2 coins are resting on each other in the lower corner of a conveyor segment as it starts its upward travel, within a very short space of time, the top coin is forced to roll sideways initially and thereafter slides off the lip 5 leaving only one coin thereon as desired. If on the other hand, 2 coins are resting on each other diametrically across two adjacent conveyor segments, i.e. edge to edge, then the coin at the upper corner will be knocked off by projection 25 located at position KO (see FIG. 1). In case the second coin still manages to get past the first projection 25, a second similar projection 26 is also provided.

Chamfered edge 8 (see FIG. 6) is used to unstick any coins from the conveyor should they have become attached thereto due to them being soaked in beer for instance. As the conveyor starts to rise, a coin will tend to slide down onto the lip 5 and as it does so, it will be pushed outwardly by the chamfered edge 8. This also serves to push outwardly any other coin resting on top of the coin to be paid out whereby it falls off the lip 5 onto the next available lip beneath it.

The action of the stirrers 6 is very important because they prevent groups of random coins in the bight 18 from forming into "rolls" extending across the width of the conveyor. This "rolling" is a very common phenomenon in coin handling and it should be avoided because it means that the coins end up vertically aligned and therefore they tend to roll along the conveyor instead of falling over and dropping into the spaces between the lips.

In the illustrated embodiment, all the corner radii of the conveyor track are the same which means that at no point on its path can the conveyor grip and retain a coin between two adjacent lips thereby forming a pinch point. If this were to happen, then the conveyor would jam and the motor would burn out. Whilst the avoidance of pinch points in the bight area 18 are of the most importance, it is equally necessary that there is no risk of the conveyor jamming on the uppermost part of its path after the coins have been fed off via exit 15. If the upper radii were not appropriately dimensioned to avoid jamming, a sticky coin could attach itself to the conveyor and therefore not be able to roll off into the exit 15. It would then continue round with the conveyor until it reached the first upper bend and jamming would occur. With the illustrated arrangement, this is not possible because as the conveyor goes round the upper bend, its segments articulate, thereby unsticking the coin which is free to drop back into the coin store.

The illustrated embodiment can handle single or multiple denomination coins. In other words, it can either pay out coins from the hopper which are all of the same denomination e.g. 10 p or it can handle multiple coins where 1p, 5p, 10p and 50p pieces are all mixed together in the hopper 16. With the former single coin handling, a simple counter, e.g. an electrical device such as a photoelectric detector or an inductive proximity device is fitted at the exit 15 operable so that when the desired number of coins have been dispensed, the motor 11 is switched off. Preferably, the motor is fitted with a brake to prevent inertia induced over-run so that extra coins cannot be paid out after the power supply to the motor has been switched off. If a multi-coin payout is required, then a more sophisticated counter is needed operable for instance in conjunction with a solenoid actuated gate. Such a counter could be a pair of photo-cells at different heights which count the coins required for the payout until the last coin is due. If the last coin is of too high a denomination, the gate will be actuated and the coin will be directed back into the hopper. This will continue until the correct coin arrives when the gate will revert to its alternative position and the correct coin will be paid out and the motor 11 switched off.

The mechanism is provided with a multipin plug 30 adapted to fit into an appropriate socket on the amusement or other machine to which it is to be fitted. Preferably, the base of the mechanism is provided with a guide plate (not shown) which can be readily fitted between a pair of guide rails (not shown) on the machine whereby the mechanism can be inserted into the machine between the rails and pushed home so that the plug 30 cooperates with its machine socket.

Preferably, the side plates and conveyor segment sections are moulded from a plastics material such as Polyacetal but other materials could be used e.g. Valox.

The hopper 16 may also be fitted with sensing devices (not shown) to indicate when it is nearly empty and/or full. Conveniently, photosensors located adjacent the bottom and/or top of the hopper are used but other suitable means may be employed.

The described embodiment has several important advantages in addition to those already mentioned. First of all, it is much quieter in operation than a conventional solenoid operated mechanism because of its rotary movement rather than a reciprocating one. Furthermore, it can readily incorporate sound absorbing material or it can be housed in a sound reducing closure due to its compact dimensions. Its smooth running also has the advantage that shaking and jarring of the surrounding equipment in the machine to which it is fitted is substantially reduced. Another major advantage is that the high in-rush current produced in solenoid actuated payout mechanisms which can be detrimental to delicate electronic circuitry located close by is avoided.

Finally, because of its build-in design features, the mechanism is suitable, without adaptation, for handling most world coinages so it is extremely versatile and production costs can be kept down as there is no need to produce a range of mechanisms to cover the various different coins.

We claim:

1. A coin dispensing mechanism comprising a selectably drivable endless loop conveyor whose path includes a bight portion, a store for continuously feeding a supply of the coins to be dispensed into said bight, the conveyor having a plurality of upstanding lips thereon extending obliquely across the width of the conveyor, in parallel relationship and with a spacing greater than one but less than two coin diameters, the conveyor also having stirrer means thereon for stirring the supply of coins in the bight when the conveyor is driven and causing coins to drop into the spaces between adjacent lips, the entrained coins thence being transported upwardly by conveyor to an exit point above the bight where the coins are fed from the conveyor.

2. A dispensing mechanism as claimed in claim 1 wherein the store is mounted in relation to the conveyor to feed the coins to be dispensed to the inside surface of the conveyor.

3. A dispensing mechanism as claimed in claim 1 wherein the store is mounted in relation to the conveyor to feed the coins to be dispensed to the outside surface of the conveyor.

4. A dispensing mechanism as claimed in claim 1 wherein the conveyor is formed from a plurality of hingedly connected conveyor segments, each segment having one of said lips provided thereon.

5. A dispensing mechanism as claimed in claim 1 wherein the bight is of constant radius.

6. A dispensing mechanism as claimed in claim 1 wherein all the turns of the conveyor loop are of constant radius.

7. A dispensing mechanism as claimed in claim 1 wherein the conveyor is formed from a plurality of hingedly connected conveyor segments, adjacent segments being hingedly connected by means of a pin which fits into and travels along a slot formed in a side plate provided at the opposite edges of the conveyor.

8. A dispensing mechanism as claimed in claim 1 wherein a projection is provided above the bight operable to knock off a second coin which may be entrained between adjacent lips.

9. A dispensing mechanism as claimed in claim 1 wherein the conveyor forms the bottom of the store of coins to be dispensed.

10. A dispensing mechanism as claimed in claim 1 wherein upstanding side walls are provided at each edge of the conveyor at least in the region of the bight.

11. A dispensing mechanism as claimed in claim 14 wherein each lip has an upstanding projection at one end thereof adjacent the edge of the conveyor to act as the stirring means.

12. A dispensing mechanism as claimed in claim 11 wherein the junction between each lip and the upper surface of the conveyor is chamfered, a recess being provided in the upper surface of the conveyor adjacent the junction of each lip therewith.

13. A coin dispensing mechanism comprising a selectably drivable endless loop conveyor whose path includes a bight portion, a store for continuously feeding a supply of the coins to be dispensed into said bight, the conveyor having a plurality of pick-up means thereon, each of which is adapted to entrain, in use, a coin to be dispensed as the conveyor passes through the supply thereof in the bight and transport it upwardly to an exit point above the bight where it is fed from the conveyor, and wherein the pick-up means comprises a plurality of upstanding lips, each of which has an upstanding projection at one end thereof adjacent the edge of the conveyor to act as a stirrer, the junction between each lip and the upper surface of the conveyor being chamfered, a recess being provided in the upper surface of the conveyor adjacent the junction of each lip therewith.

14. A dispensing mechanism as claimed in claim 13 wherein a projection is provided above the bight operable to knock off a second coin to be dispensed which may be resting on the pick-up means.

15. A coin dispensing mechanism comprising a selectably drivable endless loop conveyor whose path includes a bight portion, a store for continuously feeding a supply of the coins to be dispensed into said bight, the conveyor having a plurality of stirring means and a plurality of pick-up means thereon, each pick-up means being adapted to entrain a single coin to be dispensed as the stirring means passes through the supply thereof in the bight when the conveyor is driven and transports said coin upwardly to an exit point above the bight where it is fed from the conveyor, said pick-up means comprising a plurality of upstanding lips, each extending across the width of the conveyor and obliquely inclined to the direction of movement of the conveyor, said lips being parallel to each other and spaced apart by a distance greater than the size of the article to be dispensed.

16. A dispensing mechanism as claimed in claim 15 wherein each upstanding lip has an upstanding projection at one end thereof adjacent the edge of the conveyor to act as the stirring means, a recess being provided in the upper surface of the conveyor adjacent the junction of each lip therewith.

17. A coin dispensing mechanism comprising a selectably drivable endless loop conveyor whose path includes a bight portion, a store for continuously feeding a supply of the coins to be dispensed into said bight, the conveyor having a plurality of upstanding lips thereon extending obliquely across the width of the conveyor, in parallel relationship and with a spacing greater than one but less than two coin diameters, the conveyor nominally picking up one coin in each space between two lips from the supply of coins in the bight when the conveyor is driven, and means for causing detachment of any second coin in any such space as the coins are transported upwardly by the conveyor to an exit point above the bight where the coins are fed from the conveyor.

18. A dispensing mechanism as claimed in claim 17 wherein each lip has an upstanding projection at one end thereof adjacent the edge of the conveyor to act as a means of stirring the coins in the bight.

19. A dispensing mechanism as claimed in claim 18 wherein the detachment means includes a chamfered junction between each lip and the upper surface of the conveyor, a recess being provided in the upper surface of the conveyor adjacent the junction of each lip therewith.

20. A dispensing mechanism as claimed in claim 17 wherein the detachment means includes a projection above the bight operable to knock off a second coin to be dispensed which may be resting in a space between two lips.

21. A dispensing mechanism as claimed in claim 17 wherein each upstanding lip has an upstanding projection at one end thereof adjacent the edge of the conveyor to act as a means of stirring the coins in the bight, a recess being provided in the upper surface of the conveyor adjacent the junction of each lip therewith.

22. A coin dispensing mechanism comprising a selectably drivable endless loop conveyor whose path includes a bight portion, a store for continuously feeding a supply of the coins to be dispensed into said bight, the conveyor having a plurality of pick-up means thereon, each pick-up means being normally adapted to entrain a single coin to be dispensed as the stirring means passes through the supply thereof in the bight when the conveyor is driven and transport said coin upwardly past second coin detachment means to an exit point above the bight where it is fed from the conveyor, the pick-up means comprises a plurality of upstanding lips, each extending across the width of the conveyor and obliquely inclined to the direction of movement of the conveyor, said lips being parallel to each other and spaced apart by a distance greater than the diameter of a single coin and less than two such diameters.

* * * * *